INVENTOR
WALTER F. KOLODZIEJ
ATTY.

Nov. 29, 1966  W. F. KOLODZIEJ  3,287,896
AUTOMATIC REGULATOR FOR AUTOMOBILE CLOCK OR THE LIKE
Original Filed April 29, 1964  4 Sheets-Sheet 4

Fig. 5a
REGULATOR SHIFT MEMBER ARMED AND IN MID POSITION

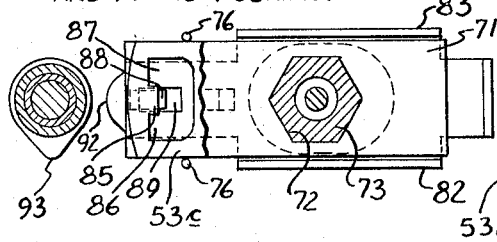

Fig. 6a

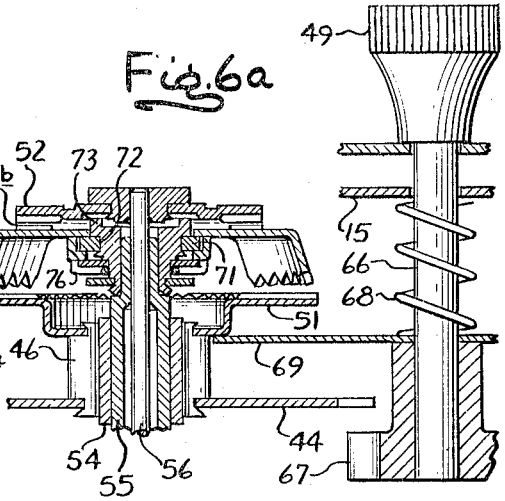

Fig. 5b
CLUTCH DISCS ENGAGED—REGULATOR SHIFT MEMBER ROTATED BY FIRST CLUTCH DISC ACTS THRU SECOND CLUTCH DISC TO ADVANCE REGULATOR SHAFT AND LATCH ITSELF

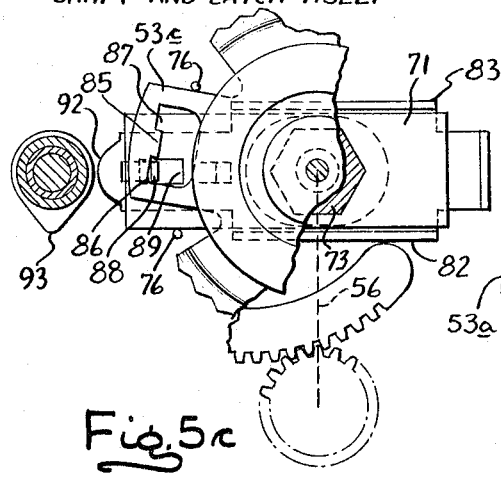

Fig. 6b

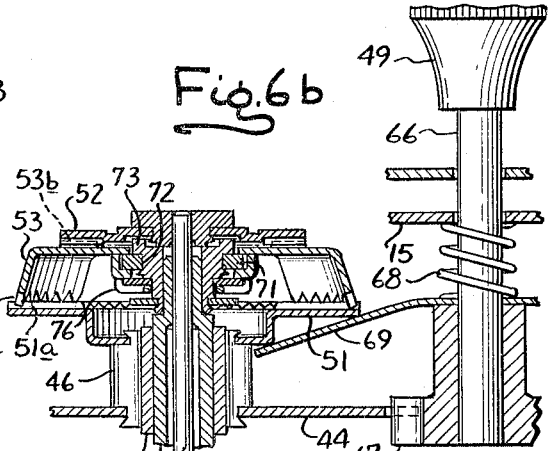

Fig. 5c
LATCH RELEASED BY HOUR WHEEL CAM, SHIFT MEMBER RESTORED TO MID POSITION

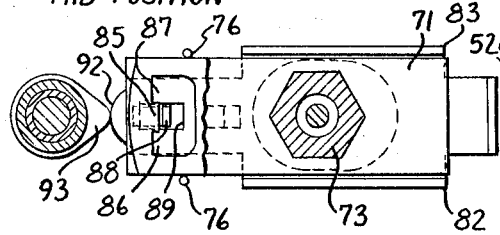

Fig. 6c

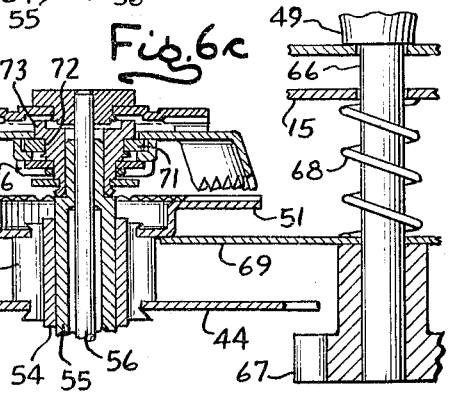

INVENTOR
WALTER F. KOLODZIEJ
by: [signature]
ATTY.

United States Patent Office 3,287,896
Patented Nov. 29, 1966

3,287,896
AUTOMATIC REGULATOR FOR AUTOMOBILE
CLOCK OR THE LIKE
Walter F. Kolodziej, La Salle, Ill., assignor to General
Time Corporation, New York, N.Y., a corporation of
Delaware
Filed Oct. 18, 1965, Ser. No. 502,764
3 Claims. (Cl. 58—85.5)

This application is a continuation of my application Serial No. 363,527, filed April 29, 1964, now abandoned.

The present invention has to do with a clock regulator mechanism and more particularly to a regulator which is operated automatically incident to setting the hands of the clock.

Because of the conditions under which they must operate, automobile clocks have not been noted for their timekeeping qualities. Such clocks are subject to shock and vibration, invasion of dust, extremely wide temperature swings, and, in the case of electrically wound clocks, wide variations in the applied voltage. Moreover, since automobile clocks are usually not well maintained, as regards cleaning and lubrication, the situation gradually becomes worse until the clock is no longer relied upon.

In Patent No. 3,141,291, issued July 21, 1964 to the assignee of this application, there is shown a clock regulator mechanism which functions automatically upon setting of the clock hands. That is, when the hands are adjusted forward to the correct time, the regulator is moved to "speed up" the clock, and when the hands are moved back the clock is automatically slowed down. This kind of adjustment tends to "zero in" the clock to a correct timekeeping rate and also compensates for the various factors which adversely affect automobile clock accuracy.

In an automatic regulator of this kind, it is obviously desirable to make the regulator adjustment proportional to the distance through which the clock hands must be set to the correct time, thus avoiding a kind of oscillation of clock speed from too fast to too slow. Also, regulator mechanism for automobile clocks must be particularly rugged and dependably positive acting to withstand their environment and the to-be-expected rough handling.

Accordingly, it is the primary aim of the invention to provide an improved automatic regulator mechanism of the above kind which gives a reliable and positive adjustment to the clock regulator that is closely proportional to the amount of adjustment made to the positions of the clock hands.

It is also an object to provide a regulator mechanism of this character which is rugged and dependable so as to be well suited for automotive clock applications.

In more detail, it is an object to provide a novel clutch for a regulator mechanism of the above type which is economical to manufacture, compact and capable of greatly improving the performance of the mechanism.

Other objects and advantages of the invention will become apparent upon reading the attached detailed description and upon reference to the drawings in which:

FIG. 4 is a fragmentary perspective showing the condition of the regulator shift member following a step of regulation.

FIGS. 5a–5c are fragmentary views showing the respective positions of certain parts in the regulator shift mechanism initially, latched after the step of regulator adjustment, and armed for a further step of adjustment following passage of a time interval.

FIGS. 6a–6c are a series of views corresponding to FIGS. 5a, 5b and 5c and taken at right angles thereto.

While the invention has been described in connection with a preferred embodiment, it will be understood that the invention is not limited to the particular embodiment shown and that I intend, on the contrary, to cover the various alternative and equivalent constructions falling within the spirit and scope of the appended claims.

Figure 1:
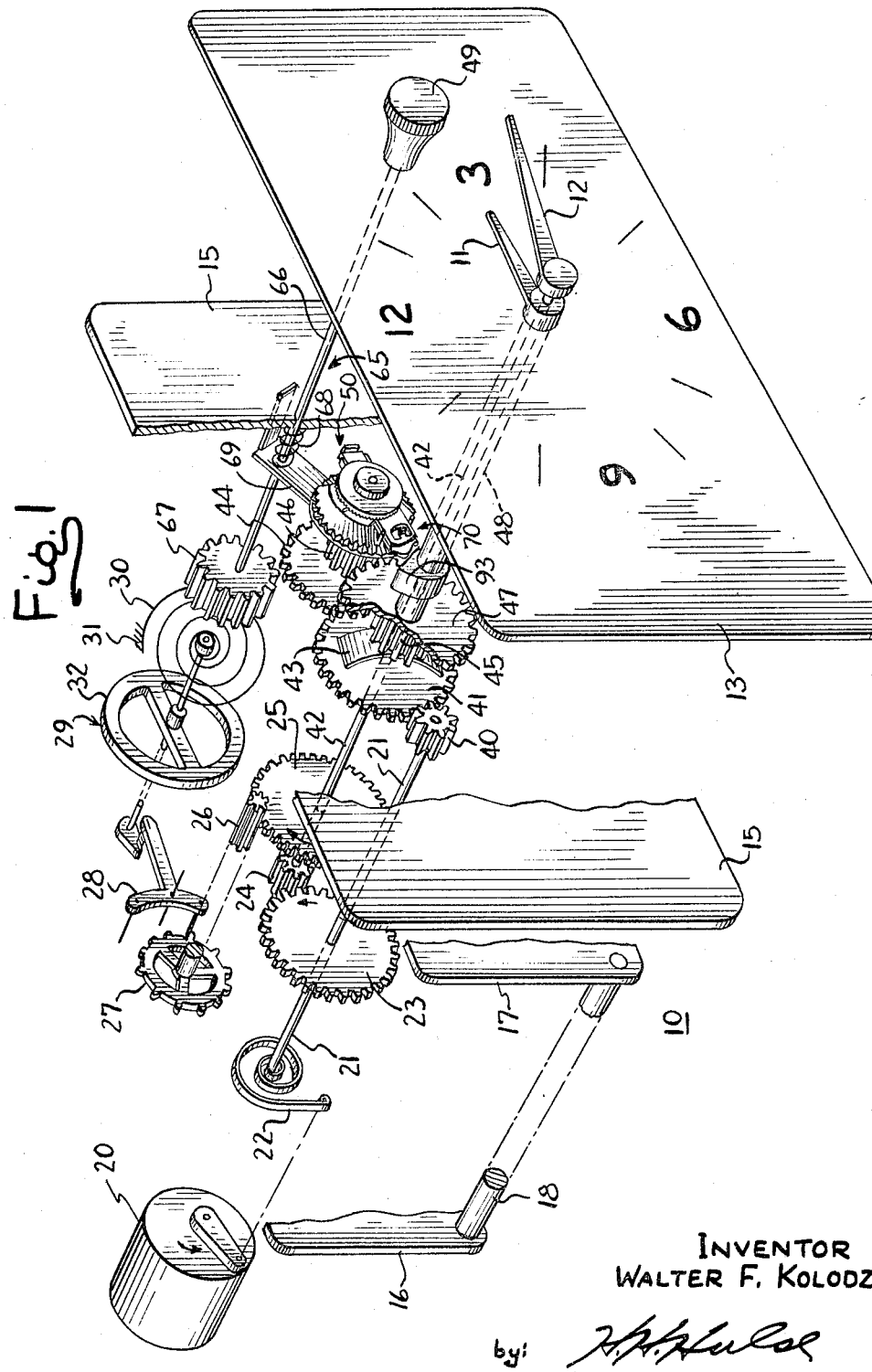
FIGURE 1 is a perspective view of a clock mechanism employing the invention, partly distorted and with portions broken away to reveal the internal construction.

Turning now to FIG. 1 there is shown an automobile clock 10 having an hour hand 11 and a minute hand 12 and a bezel 13. The frame of the clock includes a front plate 15 and a pair of relatively smaller frame plates 16, 17, the plates being held in spaced relation by suitable posts or spacers 18.

Figure 2:
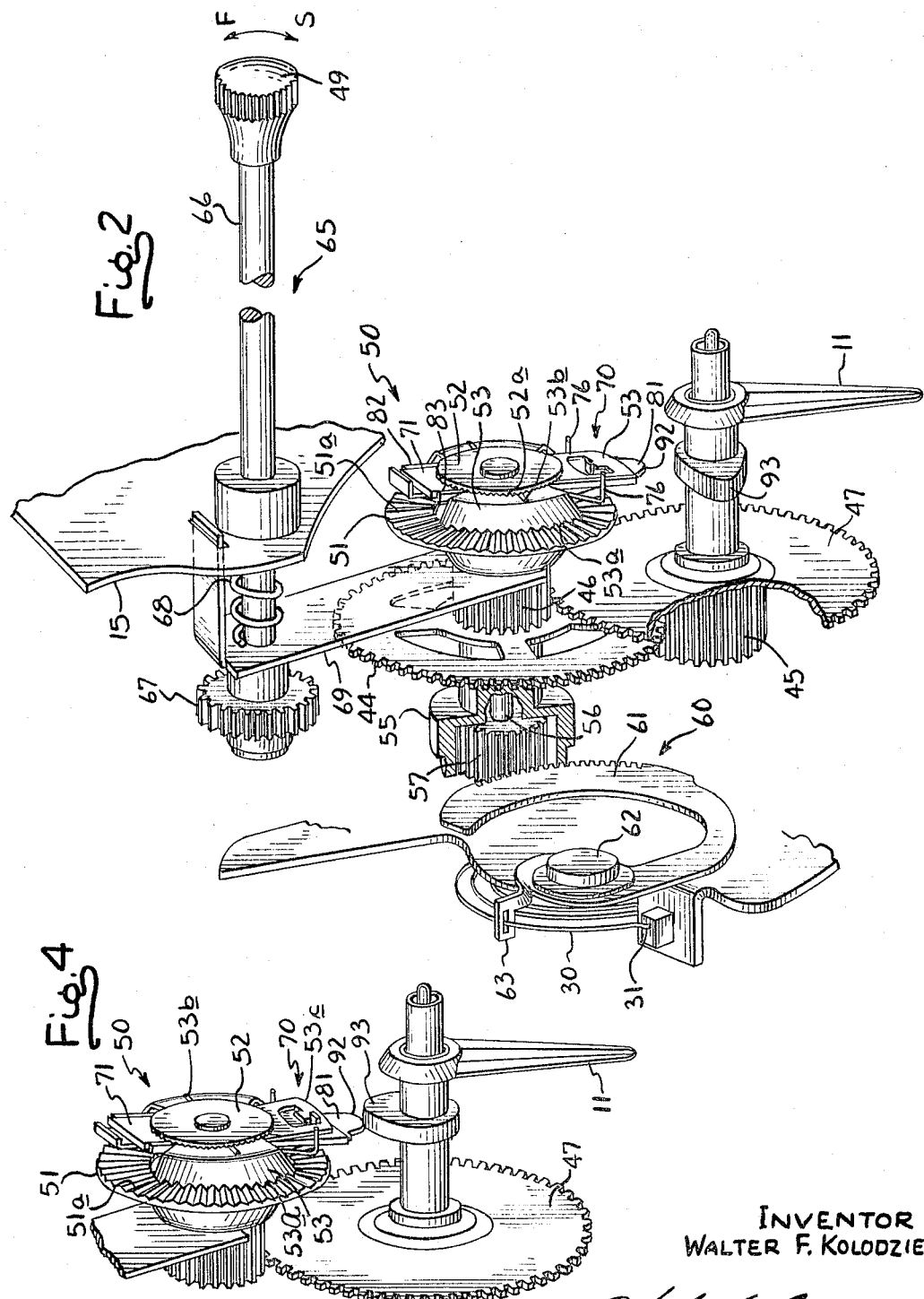
FIG. 2 is an enlarged perspective, also with portions broken away, of the automatic regulator mechanism used in the clock of FIG. 1.

Prior to discussing the regulator features of the present invention, it will be helpful to have in mind the clock train and driving mechanism of a typical battery powered automobile clock to which the present invention has been applied, with reference being made to the prior art for details of construction. For driving the clock an input shaft 21 is provided having an associated spring 22 which is wound at frequent intervals by a suitable battery powered winding mechanism 20 which may, for example, be the type disclosed in Patent No. 2,279,015, which issued April 7, 1942. The torque from the spring 22 is thus applied to an input gear 23 which drives a pinion 24 connected to an intermediate gear 25. The latter meshes with a pinion 26 on an escapement wheel 27 which advances intermittently under the control of an escapement lever 28 and spring balance 29. The spring balance includes a hair spring 30 which is anchored at its outer end 31 (see FIG. 2) and the inner end of which is connected to the balance wheel 32 for rotation of the train at a timed rate. For rotating the minute hand of the clock, the input shaft 21 is forwardly extended terminating in a pinion 40 which meshes with a minute hand gear 41 which is frictionally coupled to a minute hand shaft 42 by a spring 43. For driving the hour hand, a motion gear 44 is provided meshing with a pinion 45 on the minute hand shaft and having a pinion 46 driving an hour wheel 47, the latter being connected by a hollow shaft 48 to the hour hand. It will be apparent, then, that rotation of the input shaft by torque supplied by the spring 22 is effective to rotate the train, and the hour and minute hands which are coupled thereto, at a rate which depends upon the adjustment of the spring balance. Extending forwardly through the bezel 13 is a setting knob 49 which, when setting the hands, is coupled to the motion gear 44.

Figure 3:
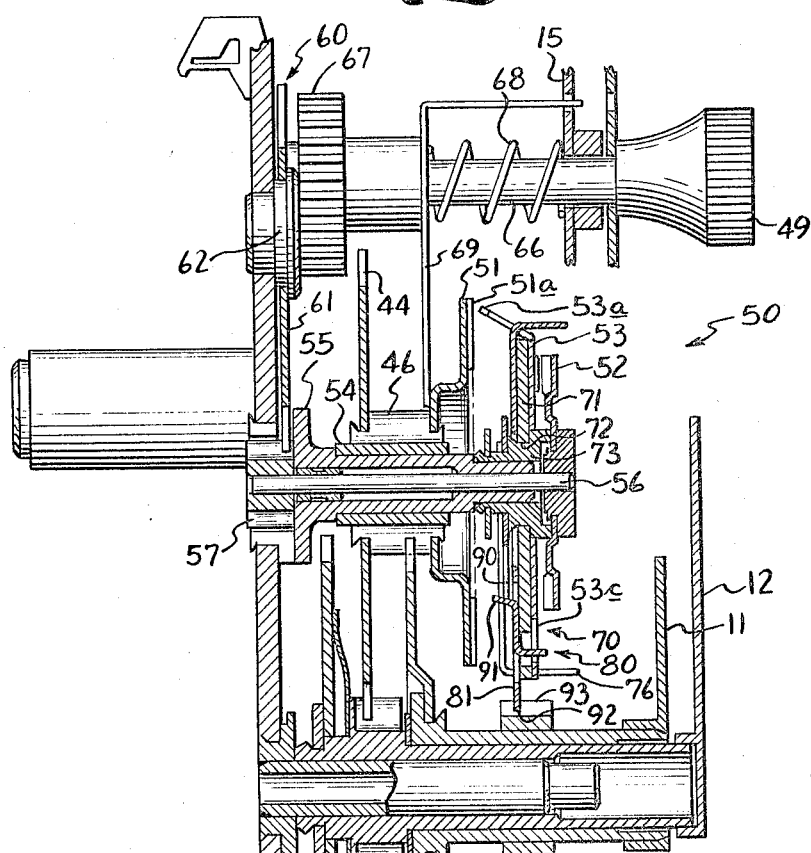
FIG. 3 is a cross section along the line 3—3 in FIG. 1, i.e., on a plane which includes the axes of the motion wheel and hour wheel.

In accordance with the present invention, novel means are provided responsive to the setting of the hands of the clock for imparting a step of adjusting movement to the spring balance. More specifically, a regulator shift member is employed which is coupled to the setting knob when the knob is moved endwise and which, upon rotation of the knob, imparts a corrective step of adjustment to the balance adjusting means. Still more specifically in accordance with the invention, a first clutch member is provided which is coupled to the setting knob, a second clutch member is provided which is coupled to the balance adjusting means, and the regulator shift member is interposed between them to transmit movement between the clock members and to limit the movement to a single, incremental step of adjustment. Thus, turning to the drawings, and particularly to FIGS. 2 and 3, there is provided a regulating mechanism 50 including a first clutch member 51, a second clutch member 52 and an interposed regulator shift member 53. The first clutch member 51 is directly coupled to the motion gear 44 by staking to the motion gear pinion 46. The assembly thus formed is mounted on an anti-friction sleeve 54 which is mounted for rotation upon a pedestal 55. For the purpose of connecting the second clutch member 52 and the spring balance for adjusting the latter, the pedestal is hollow and the second clutch member is provided with a regulator shaft 56 which extends through the pedestal terminating in a regulator pinion 57. The latter serves to position a balance adjusting means 60 formed of a circular rack 61 having a friction pivot 62 and terminating in a hair spring engaging arm 63 which serves to grip the outer convolution of the hair spring, changing the effective length of the hair spring and hence its period of vibration.

In order to press the clutch members into engagement with the shift member for transmission of rotary movement during the setting of the clock hands, a setting mechanism 65 is provided including the setting knob 49 secured to a setting shaft or stem 66 and mounted for axial as well as rotary movement in the plate 15. Fastened to the end of the stem 66 is a setting pinion 67 pressed inwardly by a biasing spring 68. Thus, when the setting knob is pulled out the pinion 67 is moved endwise into mesh with the motion gear 44. Simultaneously a resilient lift arm, indicated at 69, which extends laterally from the stem 66, and is held captive thereon, applies upward force to the motion wheel assembly 44, 46, 51, causing the latter to slide to the right (FIG. 2) bringing the clutch member 51 into clutching engagement with the shift member 53 and causing the latter to crowd against the second clutch member 52. With the clutch members thus in the "clamped up" condition, rotation of the setting knob 49 is effective, not only to set the hands via the motion gear but also to produce rotation of the regulator shaft 56 and movement of the balance adjusting means 60. For the purpose of insuring transmission of torque at the clutching surfaces, the surfaces are serrated, or roughened, as shown. Thus the first clutch member 51 is provided with a serrated surface 51a which engages teeth 53a on the shift member 53. Similarly the clutch member 52 is provided with serrations 52a engaging radial ridges 53b formed on the upper surface of the shift member 53. Since the lift arm 69 is of resilient construction, the serrations insure that sufficient torque is transmitted to accomplish regulation while enabling any excess movement to be accommodated by slippage.

The clutch members 51 and 52 are preferably circular so that the serrated surfaces 51a and 52a define annular arrays of axially extending serrations. The shift member 53 is preferably butterfly shaped so that the teeth 53a are formed in two arcuate arrays disposed symmetrically, and axially alined, with the serrated surface 51a. The serrations on the surfaces 51a, 52a, the teeth 53a and the ridges 53b are all minute so that the parts can mate easily in vertually any angular position without appreciable rotational shifting of the parts.

In accordance with one of the important aspects of the present invention, means are provided for limiting the rotational movement of the regulator shift member to a small amount in either direction from a reference position regardless of the amount that the setting knob is rotated thereby to limit the regulating movement to a single incremenal step when the hands of the clock are set. More specifically in accordance with the invention, means are provided in the form of a latching assembly 70 for latching the regulator shift member in its displaced position so that it is temporarily disabled and subsequently unlocked, or armed, by rotation of the clock train thereby insuring that a time interval must pass between successive steps of regulating movement and insuring against "over regulation" upon repeated twisting of the setting knob. For the purpose of supporting the shift member 53 and to determine a central or reference position for this member, a support member 71 is provided in the form of a rectangular plate having a hexagonal opening 72 (see FIG. 5a) which is staked in place on a stationary bushing 73 which is stationarily mounted at the end of the pedestal 55 (see FIG. 3) previously referred to. Lying flatly adjacent the end portion of the support 71 is an arm which is integral with the regulator member 53. The arm 53c has the same width as the support member 71. To bias the arm into a central or reference position with respect to the spport, a centering spring 76 is provided having tips bent at right angles as shown in the drawings. It will be apparent, then, that any tendency for the shift member 53 to rotate out of a condition of alinement with respect to the supporting member 71 is resisted by the spring 76, i.e., the regulator member 53 tends to occupy the alined position shown in FIG. 2.

Figure 7:
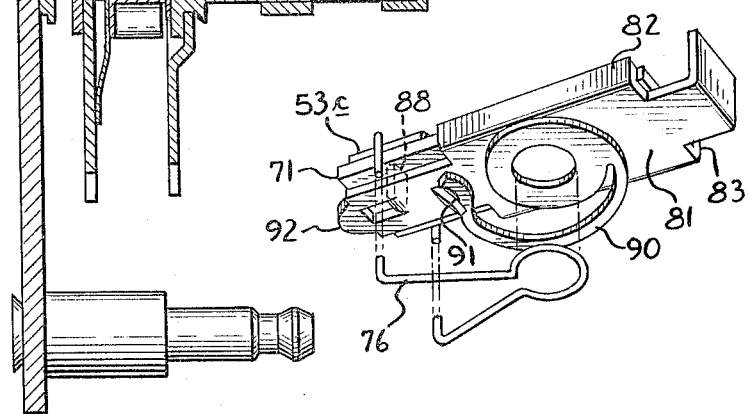
FIG. 7 is a fragment perspective of the underside of the slide and showing the spring biasing means in the regulator mechanism.

In order to lock the shift member temporarily in its displaced position until passage of a time interval, a latch mechanism 80 is provided. This latch mechanism includes a slide 81 which is slidable adjacent to, and below, the support member 71 previously referred to. For guiding the slide for movement parallel to the support member, the slide is provided with upturned edges 82, 83. To provide the latching engagement between the support member 71 and the shift member 53, the arm 53c of the shift member is cut out to provide a central support 85 (see FIG. 5a) flanked by left and right hand notches 86, 87 cooperating with a latching lug 88 which is bent up out of the metal of the slide and which passes through a clearance slot 89 formed in the support member. For the purpose of biasing the slide, and the lug 88 thereon, endwise with respect to the support member 71, a specially shaped expansion spring 90 (FIG. 7) is provided which engages a lug 91 bent downwardly out of the plane of the slide.

In order to reset the slide to its retracted position permitting the regulator shift member to be restored to its central position and thus "rearming" the regulator mechanism after passage of a time interval, i.e., after rotation of the clock train, the slide 81 is extended forwardly to provide a cam follower surface 92 which is arranged in the path of movement of a cam 93 secured to the hour wheel 48. Thus, upon rotation of the hour wheel wiping engagement between the cam 93 and the edge 92 presses the slide and the lug 88 thereon backwardly against the force of the biasing spring 90 so that the lug may clear the notch in which it is seated, enabling the shift member 53 to move, under the action of its centering spring 76, to its centered or reference position.

The operation of the regulator and its associated latching mechanism may be understood by reference to the stop motion views 5a, 5b, 5c, and the associated views 6a, 6b, 6c. Thus under initial conditions the clutch members 51, 52 are disengaged, or only lightly engaged, enabling the shift member 53 to be restored to, and held in its central reference position by the centering spring 76. When it is desired to set the clock, the setting knob 49 is pulled out moving the setting pinion 67 into mesh with the motion wheel 44 which rotates the hour and minute hands of the clock. Such motion is accommodated by slippage occurring at the spring 43 associated with the minute wheel 41 (see FIG. 1).

Retraction of the setting knob serves, simultaneously, to raise the lift arm 69, as indicated in FIG. 6b, thus pressing the clutch surfaces into driving engagement so that rotation of the motion wheel 44 causes the shift member 53, and the second clutch member 52 to which it is clutched, to rotate through a small arc as shown in FIG. 5b. This advances the regulator shaft 56 and its pinion 57 to impart an increment of movement to the balance adjusting means, i.e., the rack 61. As the shift member 53 rotates through a single step or increment with respect to the lug 88 which is relatively stationary, the lug drops off of the corner of the support 85 and into the notch 86, thus locking the shift member to its stationary support 71 which, as previously noted, is rigid with the frame of the clock. With the shift member locked in position, the continued movement of the motion gear 44, as required to set the hands of the clock to the correct time, is idle, with slippage taking place at the clutch surfaces. Because of the latching, the regulator mechanism is effectively disabled and further movement of the setting knob backwardly or forwardly is thus ineffective to produce any additional regulatory movement. This is significant since it is the direction of the initial movement which determines the sense of the regulation adjustment, even though the setting knob may have to be subsequently jockeyed back and forth in order to set the minute hand accurately on the desired minute. Moreover, the latching insures that a person setting the hands several times within a short interval of time, will not, inadvertently, produce an "excessive," and needless, regulation adjustment. Stated in other terms, a child or adult playing with the setting knob will not be able to throw off the regulation adjustment by an amount which may be subsequently time consuming to correct. Note also that the same amount of regulation adjustment is imparted to the spring balance regardless of the amount of knob movement required to set the hands to the correct time. Thus the amount of correction does not depend upon the time interval, whether days or weeks, which may have elapsed since the time was last set, tending to insure further against "excessive" regulation adjustment. Releasing the knob serves to release the clutch surfaces (FIG. 6c).

Upon passage of time, the cam 93, which is secured to the hour wheel, moves around into wiping engagement with the edge 92 on the slide as indicated in FIG. 5c. This lifts the lug 88 from the notch 86, permitting the lug to "clear" the supporting edge 85 so that the shift member 53 with arm 53c thereof, is free to rotate back into its central or reference position under the urging of the centering spring 76. While the operation has been discussed in connection with relative correcting movement of the shift member 53 in one direction, it will be apparent that the latching and subsequent release will occur in the same way upon displacement of the shift member in the opposite direction.

Since the mating portions on the clutch members 51, 52 and the shift member 53 are minute, there is no rotation of the regulator pinion 57 simply upon engaging the clutch, nor is there lost-motion upon turning the setting knob before the regulator pinion starts to move. The ridges 53b do not slip over the surface 52a so there is little wear of these parts and, because of the arcuate arrays of the teeth 53a, there are a large number of meshing surfaces between the relatively slipping members 51 and 53 so that reliability and accuracy is maintained.

It will also be appreciated that the motion gear 44 moves with the clutch member 51 and away from the setting pinion 67 when the knob 49 is manipulated. Thus, before the gear 44 stops and is engaged by the pinion 67, the clutch members must be locked up. This insures that the clock hands cannot be inadvertently moved without coupling in the regulator adjustment.

I claim as my invention:

1. In a clock having a spring balance timing control and a hand-setting motion gear, the combination comprising, a shaft coupled to said timing control for adjusting the control upon rotation of the shaft, a first clutch member fixed on said shaft and having an annular array of axially extending serrations, a second clutch member coupled to said motion gear and having an annular array of serrations extending axially toward and being axially alined with the serrations of the first clutch member, said second clutch member being axially slidable towards said first clutch member, a shift member rotatably mounted between said first and second clutch members and having serrations facing the serrations on both said first and second clutch members, a latch coupled to said shift member for limiting rotation thereof, a setting knob coupled to a pinion and mounted for axially shifting said pinion from a rest position into meshing engagement with said motion gear, and means for sliding said second clutch member resiliently against said shift member, rotatably engaging the clutch members by mating the clutch member and shift member serrations, upon movement of said knob to mesh the pinion with the motion gear.

2. The combination of claim 1 in which said motion gear is fixed for axial movement with said second clutch member and said means comprises a resilient arm connecting said pinion and said second clutch member, so that the clutch members resiliently sandwich said shift member before the pinion engages said motion gear.

3. The combination of claim 1 in which the serrations on said shift member facing the serrations on said first clutch member are formed in two arcuate arrays disposed symmetrically on opposite sides of said shaft in axial alinement with the first clutch serrations.

References Cited by the Examiner

UNITED STATES PATENTS

| | | | |
|---|---|---|---|
| 2,542,430 | 2/1951 | Rabinow | 58—109 |
| 2,941,349 | 6/1960 | Lux | 58—85.5 |
| 2,976,673 | 3/1961 | Petters et al. | 58—85.5 |
| 3,113,417 | 12/1963 | Bly | 58—85.5 |
| 3,141,291 | 7/1964 | Spetzler | 58—85.5 |
| 3,157,023 | 11/1964 | Mutter | 58—85.5 |
| 3,177,648 | 4/1965 | Boyles | 58—85.5 |
| 3,216,189 | 11/1965 | Boyles | 58—85.5 |

RICHARD B. WILKINSON, *Primary Examiner.*

LOUIS J. CAPOZI, *Examiner.*

G. F. BAKER, *Assistant Examiner.*